3,533,826
STABLE NONAQUEOUS ADHESIVE SYSTEM
Dominic R. Falgiatore, Philadelphia, Pa., assignor to Rohm and Haas Company, Philadelphia, Pa., a corporation of Delaware
No Drawing. Filed Aug. 10, 1967, Ser. No. 659,586
Int. Cl. B44c 1/08
U.S. Cl. 117—33      4 Claims

ABSTRACT OF THE DISCLOSURE

A nonaqueous dispersion containing (A) an addition polymer which is dispersed, but not dissolved in a hydrocarbon medium, (B) an aminoplast, which is a condensate of formaldehyde with a nitrogen compound and a higher aliphatic alcohol and (C) a neutralized acid catalyst is used as an adhesive. The adhesive is particularly characterized by a stable, extended shelf life. The adhesive thus composed provides flocked articles characterized by improved water-resistance, wet abrasion or crock resistance, wet and dry peel strengths, washfastness, drycleanability and higher flock density. In addition, the flock adhesive is also characterized by improved flow properties, and a resistance to arcing when employed in electrically motivated flocking processes.

---

This invention relates to novel adhesive compositions used in producing flocked or fluffed articles having improved properties, such as excellent water-resistance, washfastness, drycleanability and wet crock or abrasion resistance, to methods for their use and to the articles produced therefrom. More particularly, this invention relates to a flock adhesive system based on a nonaqueous dispersion of an addition polymer in the form of fine particles insoluble in the dispersing medium, but dispersed therein in a condition of stabilty.

Generally, flock adhesve compositions have been either aqueous dispersion systems, or organic solvent solution systems. For example, U.S. Pat. 3,249,457 discloses a flock adhesive composition consisting of an aqueous system based on an acrylic-melamine condensate in combination with an acrylic latex consisting of an aqueous dispersion of a copolymer of methly methacrylate, methacrylic acid or itaconic acid and ethyl acrylate.

A large amount of fabric laminates, flocked fabrics and bonded nonwovens are designed into wearing apparel, therefore the adhesive composition used in these articles must possess certain characteristics needed to fit the finished product for the particular end use. An important characteristic required for the adhesive used in most items of apparel is resistance to water, so that the article is washfast and resistant to wet abrasion. The prior art has attempted to develop a flocked article having these characteristics, but the results achieved have not been entirely satisfactory. For example, U.S. Pat. 3,249,457 discloses the obtention of a flocked article that showed wear after only 1000 rubs when wet abrasion resistance was measured by means of a Crockmeter. These results obtained in the wet crock resistance test, although still unsatisfactory, were significantly superior to results obtained for flocked articles using other conventional flock adhesives; the latter flocked articles failed after only 125 and 190 rubs. A comparative showing of the wet abrasion resistance of the flocked articles of this invention will be fully discussed hereinbelow.

It is an object of this invention to provide an adhesive particularly characterized by stability or freedom from gelling during storage and transit, and to provide flocked articles having improved water-resistance, improved wet abrasion or crock resistance, improved washfastness and drycleanability, and higher flock density. It is another object of this invention to provide a flock adhesive capable of imparting the improved characteristics noted above to a flocked article, and also capable of providing rubber-to-flocked article laminates having improved wet and dry peel strengths. It is still a further object of this invention to provide a fabric material coated with an adhesive that will not arc when submitted to an alternating current electrostatic flocking machine. It is yet another object of this invention to provide a flock adhesive having improved flow properties for flock printing.

It has been discovered that the use of adhesives based on nonaqueous dispersions of polymers which are crosslinked by means of a readily dissociated salt of a neutralized acid catalyst to an aminoplast, defined hereinbelow, provide flocked fabrics having the desired characteristics described hereinabove. The flock adhesives of this invention also have an unexpectedly higher solids content than those obtained from solvent solution, or aqueous dispersion systems.

In accordance with this invention, a nonaqueous dispersion comprising the reaction product of (A) an addition polymer formed from at least one monoethylenically unsaturated monomer having a group $H_2C=C<$ dispersed, but not dissolved, in a hydrocarbon medium consisting essentially of one, or a mixture of one or more liquid aliphatic hydrocarbons, or mixtures of a major amount of an aliphatic hydrocarbon and a minor amount of an aromatic hydrocarbon, (B) an aminoplast resin, which is a thermosetting material formed by the condensation of formaldehyde with a nitrogen compound and a higher aliphatic alcohol, and (C) a neutralized acid catalyst and a suitable dispersant is used as an adhesive. The aminoplast, component (B) and the acid catalyst, component (C) are added to a nonaqueous dispersion of polymer, component (A). The proportion of the nonaqueous dispersion of polymer, component (A), in the adhesive composition, based on the total weight of the adhesive composition, is from about 88 to about 94 weight percent; a range of from about 89 to about 91 weight percent is preferred. The proportion of polymerizable monomeric material in the nonaqueous dispersion pre-polymer is from about 50 to about 60 weight percent, based on the combined total weight of monomeric material, dispersant and dispersing medium. The proportion of aminoplast, component (B) in the adhesive composition, based on the total weight of dispersion solids is from about 2 to about 10 weight percent; the preferred proportion of aminoplast is from about 4 to about 8 weight percent. The proportion of acid catalyst, component (C) in the adhesive composition, based on the total weight of dispersion solids, is from about 3 to about 7 weight percent; the preferred proportion of catalyst is from about 4 to about 6 weight percent. The total solids content for the adhesive composition may range from about 55 to about 65 weight percent, based on the total weight of the adhesive composition; the preferred range is from about 58 to about 61 weight percent.

The catalytic component (C), of this invention is a neutralized acid catalyst in the form of a readily dissociated weak base salt of a strong acid, such as a weak, fat-soluble tertiary amine salt of a strong acid, such as a sulfonic acid. The catalyst must be relatively soluble in the non-aqueous dispersion medium defined hereinabove. If a non-neutralized strong acid catalyst were solely in a continuous phase with the aminoplast component and segregated from the non-aqueous polymer dispersion, then it would promote the self-crosslinking of the aminoplast in preference to the desired promotion of inter-crosslinking, such as between a hydroxyl group containing polymer dispersed in the nonaqueous dispersing medium and the aminoplast. The neutralized acid catalyst of this invention is characterized by solubility properties that enable it to be present in the non-aqueous dispersion medium as well as in a continuous phase with the aminoplast. Therefore, the problems caused by a free acid catalyst segregated in a continuous phase with the aminoplast are obviated, so that the adhesive system of this invention may be formulated in a single package without the danger of gelation. Representative of the catalysts used in the non-aqueous system of this invention are tricaprylylamine p-toluene sulfonate, and other tri($C_6$–$C_{18}$) alkyl amine salts, such as of benzene and naphthalene sulfonic acids, phosphoric acid, formic acid, maleic acid, citric acid and fumaric acid.

The monomers that can be used to produce the dispersed, but undissolved, addition polymers of the present invention may be any monethylenically unsaturated monomer which if used alone does not produce a polymer soluble in the hydrocarbon medium employed, or if used with other monomers does not produce with the monomers used a copolymer soluble in such media. Representative monomers include acrylonitrile and methacrylonitrile, acrylic acid, methacrylic acid, itaconic acid, and the esters of these acids, especially of acrylic or methacrylic acids, with saturated alcohols having 1 to 4 carbon atoms, the monoesters of ethylenically unsaturated dicarboxylic acids, such as methyl hydrogen itaconate, vinyl esters of acids having 1 to 3 carbon atoms, acrylamide, methacrylamide, vinyl chloride, and vinylidene chloride. In general, polymers and copolymers having any proportion of one or more of these several monomers produce polymers and copolymers which are adequately insoluble in the hydrocarbon solvent used.

In addition to the monomers above, a minor proportion of a vinyl aromatic compound, such as styrene, vinyl toluene or vinyl naphthalene and similar proportions of higher saturated alcohol esters of acrylic acid or methacrylic acid or of higher aliphatic vinyl esters, such as those of the acids having from 4 to 18 carbon atoms may be used. For example, esters of alcohols having from 5 to 18 carbon atoms with acrylic acid or methacrylic acid, or the higher fatty acid vinyl esters mentioned which tend to impart hydrocarbon solubility to copolymers produced therefrom may be used in conjunction with other monomers to the extent that the resulting copolymer does not become soluble in the particular hydrocarbon medium employed.

The preferred non-aqueous polymer dispersions are dispersions of acrylic copolymers, such as copolymers of 5 to 10% methyl methacrylate (MMA), 2.5 to 10% hydroxyethyl methacrylate (HEMA), 2.5 to 5% methyl hydrogen itaconate (MHI) and the balance ethyl acrylate (EA) and copolymers of 5 to 10% MMA, 2.5 to 10% HEMA, 2 to 7.5% acrylic acid (AA) or methacrylic acid (MAA) and the balance EA. The most preferred polymer dispersion system is one containing acrylic acid units in the copolymer.

The dispersing medium used in this invention consists essentially of liquid aliphatic hydrocarbons. A pure aliphatic hydrocarbon or a mixture of one or more may be employed. To the extent that any particular polymer produced is insoluble in the hydrocarbon medium resulting, the essentially aliphatic hydrocarbon may be modified by the incorporation of other solvent materials, such as aromatic or naphthenic hydrocarbons and in certain instances the amount of such non-aliphatic component may attain as high as 49% by weight of the entire liquid medium. However, the liquid medium preferably consists essentially of aliphatic hydrocarbons, and in general the compositions of the present invention contain less than 25% by weight, based on the weight of the liquid medium, of an aromatic hydrocarbon and often none at all.

It is essential that the hydrocarbon be of liquid character, but it may have a wide boiling range from a minimum of about −50° C. (in which case high pressures may be needed in the polymerization) to a maximum which may be as high as 520° C. For most purposes, the boiling point should be from about 75° C. up to about 200° C. For example, petroleum naphthas having a boiling range of 115–145° C. and mineral spirits having a boiling range of 160–195° C. are suitable dispersing mediums for this invention.

The term "essentially" as used in the definition of the ingredients present in the liquid medium claimed is intended to exclude the presence of other materials in such amounts as to interfere substantially with the properties and characteristics possessed by the composition set forth but to permit the presence of other materials in such amounts as not substantially to affect said properties and characteristics adversely.

The preferred dispersing agent is a copolymer of lauryl methacrylate (LMA), isobutyl methacrylate (i-BMA) and hydroxyethyl methacrylate (HEMA) in the respective percentages by weight, based on the total weight of the monomeric material, of 45% by weight LMA, 45% by weight i-BMA and 10% by weight HEMA. An alternative, but less preferred, dispersing agent is a 50/50 copolymer of LMA and i-BMA.

The amount of dispersant in the non-aqueous polymerization medium ranges from about 2.5 to about 8 weight percent, based on the weight of the monomeric material to be polymerized. The preferred concentration of dispersing agent is from about 3 to about 5 weight percent.

Representative of the aminoplasts, or thermosetting materials formed by the condensation of formaldehyde with a nitrogen compound and a higher aliphatic alcohol, used in this invention are condensates of isophthalamide, formaldehyde and isooctyl alcohol, and condensates of melamine and formaldehyde with n-butanol or methanol. The triazine based aminoplasts are preferred, such as those based on melamine, a cyclic trimer of cyanamide. A particularly preferred aminoplast is the condensation product of n-butanol, formaldehyde and melamine. Other triazines related to melamine in structure may also be used in the practice of this invention. The triazine based aminoplasts, among other things, serve to speed the curing rate of the adhesives of this invention. The alcohol moiety of the aminoplast may be varied to alter the flow properties and the solubility characteristics of the flock adhesive, as well as vary the compatibility of the aminoplast with the non-aqueous polymer dispersion.

The adhesive of this invention may be used in the production of flocked articles. The textile fabric backing of the flocked article is preliminarily coated on one surface with the adhesive of this invention, and then fibrous flock is deposited on the coated backing either electrostatically or mechanically. The flocked article is then dried and cured at temperatures ranging from about 70° C. to about 150° C.; the curing time and temperature are adapted to the characteristics of the flock material and the backing material.

Ground nylon (40 mesh), viscous rayon (3 den., 0.75 mm.) and polypropylene (6 den., 1.5 mm.) may be used as flock material in the practice of this invention. The flock material can be readily applied to a backing material which is coated with the flock adhesive of this invention. Suitable backing materials are cotton duck, spunbonded polyester nonwoven fabric, expanded polyvinyl chloride fiber and the like.

To assist those skilled in the art to practice this invention, the following procedures are suggested by way of illustration, parts and percentages being by weight unless otherwise specifically noted.

(1) To a mixture of 492 g. of petroleum naphtha having a boiling range of 160–195° C. and 36 g. of a copolymer of lauryl methacrylate (LMA), iso-butyl methacrylate (i-BMA) and hydroxyethyl methacrylate (HEMA) in the respective weight ratio of 45/45/10 in a suitable reaction vessel equipped with an agitator, reflux condenser, gas inlet and temperature control devices are added 17 g. ethyl acrylate (EA), 10.5 g. methyl methacrylate (MMA), 10.5 g. hydroxyethyl methacrylate, 10.5 g. of acrylic acid (AA) and 0.80 g. benzoyl peroxide. The agitator is started and the reaction vessel is evacuated and repressurized with nitrogen. A slow stream of nitrogen is passed through the reaction vessel throughout the course of the ensuing polymerization reaction. The mixture is heated to 88–92° C. and held at this temperature for about 90 minutes. Then a solution of 841 g. EA, 49.5 g. MMA, 49.5 g. HEMA, 49.5 g. AA, 196 g. petroleum naphtha and 2.59 g. benzoyl peroxide predissolved in 70 g. toluene is added over a 240 minutes period. The mixture is held at 88–92° C. for about 30 minutes. A solution of 3.08 g. lauroyl peroxide in 62 g. petroleum naphtha is then added over a 90 minute period. The reaction mixture is held at 88–92° C. for another 120 minutes. Cooling is applied until the temperature is below 60° C. The condenser is set for distillation. A vacuum is applied and 195 g. of strippings are obtained. The stripped material is then transferred to another flask. The stripped material amounts to about 1557 g. To the stripped material is added at 50° C. about 109 g. of a butylated melamine-formaldehyde resin (50% solids in butanol-xylene), 47 g. tricaprylylamine p-toluene sulfonate and 70 g. of petroleum naphtha. The product is stirred at 50° C. for about 30 minutes and then removed from the reaction flask. Solids content is 60.7%.

(2) A composition is prepared in the same way as procedure (1) above except butyl phosphoric acid is substituted for tricaprylylamine p-toluene sulfonate.

(3) The compositions prepared according to procedure (1) and (2) above were placed in separate glass containers and stored under ambient conditions. The Brookfield viscosity of each composition was periodically measured to determine the shelf-life stability of each composition. The initial Brookfield viscosity for the composition of procedure (1) was about 2,000 centipoises and the initial Brookfield viscosity for the composition of procedure (2) was about 2,300 centipoises. After one week had elapsed the Brookfield viscosity for the composition of procedure (2) was about 1,210,000 centipoises and the Brookfield viscosity for the composition of procedure (1) was still about 2,000 centipoises. Even after 10 months had elapsed the Brookfield viscosity for the composition of procedure (1) was relatively unchanged from the initial viscosity determination.

(4) The adhesive composition of procedure (1) is uniformly spread on the upper surface of a cotton duck by means of a Gardner film-casting knife at a knife opening of about 0.01 inch. Ground nylon flock (40 mesh) is then mechanically deposited on the surface of the adhesive while vibrating the adhesive coated fabric with a beater bar. The flocked article is air dried at room temperature for about 5 minutes and maintained at 140° C. for about 5 minutes. After curing, the flocked article possesses an excellent flock density, a pleasing hand, excellent water-resistance, washfastness, solvent-resistance and wet abrasion (rub) resistance.

(5) Two test pieces of the flocked article produced in procedure (4) are tested for wet and dry abrasion resistance. The testing is conducted with a Taber Abraser Model 174, equipped with CS–17 wheels and 1,000 g. weights. One of the test pieces is soaked in water for about 24 hours at room temperature prior to the wet abrasion resistance test. As many as 2,000 abrasion cycles (or rubs) are necessary to produce a significant amount of wear in both the dry and wet test pieces.

It is to be understood that changes and variations may be made without departing from the spirit and scope of the invention as defined by the appended claims.

What is claimed is:

1. In a method for producing a flocked article comprising the steps of applying an adhesive composition to that surface of the article which is intended to receive a coating of fibers, depositing fibrous flock material on the adhesive layer, and then drying and heating the fiber-coated article to cure the adhesive to solvent-resistant condition, the improvement wherein there is applied as the adhesive composition, a dispersion of an addition polymer formed from at least one monoethylenically unsaturated monomer having a group

in an essentially liquid aliphatic hydrocarbon medium in which the polymer is not dissolved containing, dissolved therein, an alkylated aminoplast and a tri-($C_6$–$C_{18}$)-alkyl amine salt of a strong acid, the polymer containing units having a group reactive with the aminoplast during the heating step.

2. In a method for producing a flocked article comprising the steps of applying an adhesive composition to that surface of the article which is intended to receive a coating of fibers, depositing fibrous flock material on the adhesive layer, and then drying and heating the fiber-coated article to cure the adhesive to solvent-resistant condition, the improvement wherein there is applied as the adhesive composition, a dispersion of an addition polymer formed from at least one monoethylenically unsaturated monomer having a group

in an essentially liquid aliphatic hydrocarbon medium in which the polymer is not dissolved containing, dissolved therein, an alkylated aminoplast and a tri-($C_6$–$C_{18}$)-alkyl amine salt of a strong organic acid, the polymer containing units having a group reactive with the aminoplast during the heating step.

3. In a method for producing a flocked article comprising the steps of applying an adhesive composition to that surface of the article which is intended to receive a coating of fibers, depositing fibrous flock material on the adhesive layer, and then drying and heating the fiber-coated article to cure the adhesive to solvent-resistant condition, the improvement wherein there is applied as the adhesive composition, a dispersion of an addition polymer formed from at least one monoethylenically unsaturated monomer having a group

in an essentially liquid aliphatic hydrocarbon medium in which the polymer is not dissolved containing, dissolved therein, an alkylated aminoplast and a tri-($C_6$–$C_{18}$)-alkyl amine salt of a strong organic acid, selected from the group consisting of benzenesulfonic acids, toluene sulfonic acids, and naphthalene sulfonic acids, the polymer containing units having a group reactive with the aminoplast during the heating step.

4. In a method for producing a flocked article comprising the steps of applying an adhesive composition to that surface of the article which is intended to receive a coating of fibers, depositing fibrous flock material on the adhesive layer, and then drying and heating the fiber-coated article to cure the adhesive to solvent-resistant condition, the improvement wherein there is applied as the adhesive composition, a dispersion of an addition polymer formed from at least one monoethylenically unsaturated monomer having a group

in an essentially liquid aliphatic hydrocarbon medium in which the polymer is not dissolved containing, dissolved therein, an alkylated aminoplast and tricaprylyl-amine p-toluene sulfonate, the polymer containing units having a group reactive with the aminoplast during the heating step.

(References on following page)

References Cited

UNITED STATES PATENTS

| | | | |
|---|---|---|---|
| 2,484,598 | 10/1949 | Weisberg et al. | 117—139.4 |
| 2,684,346 | 7/1954 | Nickerson | 117—139.4 |
| 2,931,742 | 4/1960 | Hicks | 260—851 |
| 2,949,386 | 8/1960 | Cassel. | |
| 2,976,167 | 3/1961 | Maeder et al. | 117—33 |
| 3,090,762 | 5/1963 | Maeder et al. | |
| 3,095,388 | 6/1963 | Osmond et al. | 260—33.6 |
| 3,183,282 | 5/1965 | Hurwitz. | |
| 3,238,167 | 3/1966 | Wolff et al. | |
| 3,261,788 | 7/1966 | Carter et al. | 260—33.6 |
| 3,262,838 | 7/1966 | Vieth et al. | |
| 3,284,394 | 11/1966 | Suen et al. | 260—856 |
| 3,298,990 | 1/1967 | Cousens et al. | 260—851 |
| 3,365,414 | 1/1968 | Fisk et al. | 260—33.4 |
| 3,374,289 | 3/1968 | Ott et al. | 117—33 |
| 3,394,028 | 7/1968 | Nachbur. | |

FOREIGN PATENTS 1,363,579  6/1963  France.

WILLIAM D. MARTIN, Primary Examiner

R. M. SPEER, Assistant Examiner

U.S. Cl. X.R.

117—17; 260—33.6